United States Patent Office 3,513,134
Patented May 19, 1970

3,513,134
POLYAMIDE-IMIDE ENAMEL CONTAINING (1) DICYANDIAMIDE OR (2) DICYANDIAMIDE AND TRIPHENYL PHOSPHITE
Ronald H. Filius, Muskegon, Mich., assignor to Anaconda Wire and Cable Company, New York, N.Y., a corporation of Delaware
No Drawing. Filed Nov. 23, 1966, Ser. No. 596,443
Int. Cl. C08g 20/32
U.S. Cl. 260—78
3 Claims

ABSTRACT OF THE DISCLOSURE

A magnet wire coating composition is disclosed consisting essentially of a polyamide-imide enamel and an additive of dicyandiamide wherein the additive is present in an amount of about 0.1% or more. Various properties of the enamel are improved, including adhesion, abrasion, coatability and thermoplastic flow. The foregoing composition may also contain amounts of triphenyl phosphite.

---

This invention relates to an enamel composition and more particularly to a magnet wire coating composition and the resultant magnet wire. The invention is based on the discovery that the addition of at least one of the following additives:

(a) triphenyl phosphite

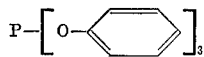

and (b) dicyandiamide (cyanoguidine)

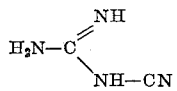

to a polyamide-imide wire enamel substantially improves the properties of the enamel. The improvements include adhesion, scrape abrasion, coatability and thermoplastic flow.

According to this invention the magnet wire coating composition comprises a polyamide-imide wire enamel in which there is at least one of the above-stated additives added, i.e., triphenyl phosphite and dicyandiamide.

The polyamide-imide wire enamel suitable for the present invention includes solutions of polymers containing both amide and imide linkages and repeating units of

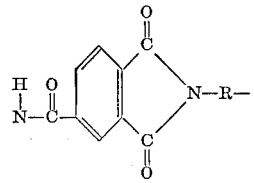

wherein R is a residue of an organic diamine (a divalent carbocyclic aromatic radical.

The polyamide-imide may be prepared by copolymerization of an acyl halide derivative of trimellitic anhydride (1,2,4-benzene tricarboxylic acid anhydride) and an aromatic primary diamine. The polymeric products may have the following structure:

(A)

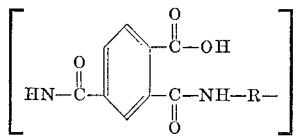

and (B)

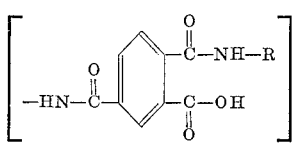

wherein R is the aromatic nucleus of the starting diamine, $H_2NRNH_2$. The linking groups are probably predominantly amido although some may be imido. The polymeric structure may also contain free carboxyl groups which are capable of further reaction. When the enamel is further reacted, for example, in the manufacture of the magnet wire the above-stated reaction products (A) and (B) are to form polymer conforming to the structure of

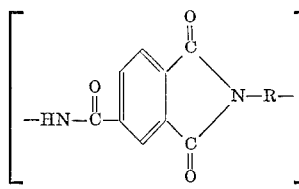

The free carboxyl groups initially present in the polymeric structure are to a substantial extent converted to imide groups by condensation with available amide groups.

The acyl halide derivatives of trimellitic anhydride that are suitable for preparing the aforementioned polyamide-imide polymer have at least one acyl halide group in the 4-ring position. They include, for example, 4-acid chloride, 1,4 and 2,4-diacid chloride (with an ester in the remaining position) and 1,2,4-triacid chloride. The bromides and other reactive halide derivatives are also suitable.

The aromatic diamine that may be used for preparing polyamide-imide enamel preferably have one or more aromatic rings and two primary amino groups. The aromatic diamines having more than one aromatic ring may be polycyclic aromatic compounds having amino groups on an interconnected polycyclic aromatic nucleus.

Specific examples on how the polyamide-imide polymers are prepared are described in greater detail in Netherlands Pat. No. 6,400,422.

The amounts of additives, triphenyl phosphite and dicyandiamide that may be used vary according to the polyamide-imide enamel used. In general, as little as 0.1% by weight calculated based on the solid content of the enamel will provide beneficial results. We found as much as 3.0% of dicyandiamide may be added to the enamel. The upper limit of dicyandiamide that may be added to the enamel, however, is not critical. Amounts much more than stated may be used but with little or no additional benefit. The addition of dicyandiamide to the enamel in the range stated decidedly improves the adhesion of the coating to the metallic substrate which may be copper or aluminum. The scrape abrasion resistance of the coating is higher. It is also noted that the coatability of the novel coating composition which releates to flowing properties and ability of the film to be continuous both longitudinally and circumferentially, is also substantially improved. The improvement in coatability renders the new composition suitable for magnet wire application, not only for round wire, but square or other configurations as well.

Up to 1.3% of triphenyl phosphite may be added to the enamel. Amounts above that may also be used but enamelling oven at a temperature up to about 400° C. for about 20 seconds. Thereafter, a series of tests were made on the wire to determine adhesion, scrape resistance, thermoplastic flow, elongation and coatability. The results of the tests are tabulated in Tables I and II. The first table compares the straight polymers with fixed amounts of dicyanamide and triphenyl phosphite alone or in combination. Table II compares additional amounts of dicyanamide additives with and without triphenyl phosphite.

TABLE I

| Test | No additives | .3% Dicy. | .3% TPP | .3% Dicy. .3% TPP | .5% TPP | .3% Dicy. .5% TPP | .5% Dicy. |
|---|---|---|---|---|---|---|---|
| Adhesion: | | | | | | | |
| Snap | Fails | OK | OK | OK | OK | OK | OK |
| Tubing, inches [1] | 1 | 1/8 | 1/16 | 1/16 | 1/16 | 1/16 | 1/16 |
| SPM | | 4X | 4X | 3X | 5X | 4X | [2] 5X |
| Scrape: | | | | | | | |
| GE | 25 | 100+ | 100+ | 100+ | 100+ | 100+ | 100+ |
| ITC | 606 | 1,030 | 1,160 | 1,240 | 840 | 977 | 1,033 |
| Thermoplastic flow, °C | 382 | 366 | 396 | 382 | 388 | 415 | 345 |
| Elongation, percent | 41 | 45 | 44 | 42 | 41 | 41 | 40 |
| Tubing, inches [1] | 7/8 | 1/16 | 1/16 | 1/16 | 1/16 | 1/4 | 1/16 |
| Coatability | 3 | 1 | 1 | 1 | 1 | 1 | 1 |

[1] Tubing also includes lifting and baring of copper.
[2] Cracks.

NOTE.—1—glassy smooth; 2—smooth to wavy; 3—slight sandy (acceptable); 4—sandy to rough (not acceptable); 5—blisters and rough (not acceptable).

TABLE II

| Test | .25% Dicy. | .5% Dicy. .5% TPP | 1% Dicy. | 1% TPP | 1% Dicy. 1% TPP | 2% Dicy. | 3% Dicy. |
|---|---|---|---|---|---|---|---|
| Adhesion: | | | | | | | |
| Snap | OK | OK | OK | OK | Fails | OK | OK |
| Tubing, inches [1] | 1/16 | 1/16 | 0 | 1/16 | S1 | 0 | 0 |
| SPM | [2] 5X Crks | 4X | 5X | 4X | | 4X | [2] 5X |
| Scrape: | | | | | | | |
| GE | 100+ | 96 | 100+ | 100+ | 100+ | 100+ | 100+ |
| ITC | 755 | 1,113 | 860 | 1,262 | 1,050 | 722 | 668 |
| Thermoplastic flow, °C | | 381 | 344 | 383 | | 341 | 333 |
| Elongation, percent | 38 | 44 | 41 | 41 | 40 | 42 | 41 |
| Tubing, inches [1] | 1/8 | 1/16 | 1/16 | 1/8 | 1/16 | 0 | 1/16 |
| Coatability | 1 | 1 | 4 | 1 | 5 | 4 | 4 |

[1] Tubing also includes lifting and baring of copper.
[2] Cracks.

without any apparent additional advantages. The addition of triphenyl phosphite to the enamel substantially increases the thermoplastic flow of the resultant composition. An increase of 25 to 35° C. may be obtained.

These two additives, preferably are used in combination for the makeup of polyamide-imide coating composition. The combined use of these additives provides additional advantages that one of the additives when used alone cannot provide. For explanation of the several terms used below such as "Snap," "SPM," etc., we refer to a description of tests employing such terms and definitions thereof which appear in U.S. Pat. No. 3,445,282. The additional features include the ability of the new coating composition to be baked at a higher temperature for the manufacture of magnet wire. The higher temperature baked product has superior properties.

The amount of dicyandiamide and triphenyl phosphite when used as combined additives may vary within the range of 0.25% to 2% for the former and 0.3% to 1% for the latter. The preferred range is about 0.3% for dicyandiamide and about 0.5% for triphenyl phosphite. To further illustrate the invention, specific examples are described hereinbelow. In these examples a polyamide-imide enamel prepared by reacting trimellitic anhydride and p,p'-methylene bis (aniline) in N-methyl-pyrrolidone, and dimethyl octamide were used. The enamel containing 20–25% solids was further diluted to a suitable viscosity for smooth application with a compatible diluent.

The additives were introduced to the diluted enamel to form the final coating compositions. The resultant coating solution was then applied to an AWG-18 copper wire to form a film of about 0.0032 inch thick, which requires less than about eight successive coats. After each coating operation, the coated wire was cured in a conventional The combination of 0.3% dicyanamide and 0.5% triphenyl phosphite yields a 415° C. thermoplastic flow which is 30° C. higher than with no additives. The adhesion is "snap-lus-4X" with only 1/16" tubing effect, which is quite acceptable.

What is claimed is:

1. A magnet wire coating composition consisting essentially of a polyamide-imide enamel solution of a polymer having both amide and imide linkages and repeating units of

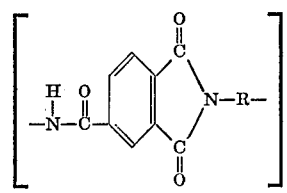

wherein R is a divalent carbocyclic aromatic radical and an additive having the following formula:

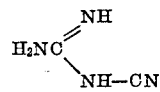

wherein the amount of such additive is 0.1% or more by weight calculated based on the solid content of the enamel.

2. A magnet wire coating composition of claim 1 wherein is present an additional additive having the formula

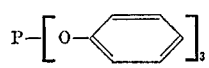

The amount of such additional additive in the coating composition is 0.1 to 3.0%, and the amount of

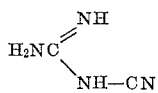

in the coating composition is 0.1 to 1.3%, said percents being percents by weight calculated on the solid portion of the composition.

3. A magnet wire coating composition of claim 1 wherein the percents of (a) 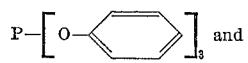 and (b) 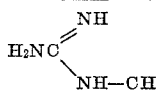

are 0.3% and 0.5%, respectively.

References Cited

UNITED STATES PATENTS

| 2,728,790 | 12/1955 | Sroog | 260—30.6 |
| 3,238,181 | 3/1966 | Anderson | 260—78 |
| 3,347,828 | 10/1967 | Stephens et al. | 260—78 |
| 3,355,427 | 11/1967 | Loncrini | 260—78 |
| 3,360,502 | 12/1967 | Loncrini | 260—78 |

FOREIGN PATENTS 570,858   7/1945   Great Britain.

HAROLD D. ANDERSON, Primary Examiner

U.S. Cl. X.R.

117—161; 260—30.6, 32.6, 45.7, 45.9